United States Patent [19]
Gobert et al.

[11] Patent Number: 5,247,586
[45] Date of Patent: Sep. 21, 1993

[54] CORRELATOR DEVICE

[75] Inventors: Jean Gobert, Maisons-Alfort; Jacques A. Sirat, Limeil-Brevannes, both of France

[73] Assignee: U.S. Philips Corporation, New York, N.Y.

[21] Appl. No.: 806,023

[22] Filed: Dec. 12, 1991

[30] Foreign Application Priority Data

Dec. 21, 1990 [FR] France .................. 90 16104

[51] Int. Cl.$^5$ .............................................. G06K 9/00
[52] U.S. Cl. ................................. 382/42; 364/728.05; 382/34; 358/105
[58] Field of Search ........................ 382/30, 34, 42; 364/728.03, 728.05; 358/105

[56] References Cited
U.S. PATENT DOCUMENTS

| 4,937,878 | 6/1990 | Lo et al. ................... | 382/34 |
| 5,109,438 | 4/1992 | Alves et al. ............... | 382/34 |

*Primary Examiner*—Leo H. Boudreau
*Attorney, Agent, or Firm*—Michael E. Marion

[57] ABSTRACT

Correlation device calculating a correlation between a current block of a first image and symbol blocks taken from a second image to determine the displacement vectors. Selection means (26) (27) select a limited number of symbols contained in the said blocks to which the correlation calculation relates. This selection can be effected by either a random choice or as a function of the data content of the blocks. The said current block can be divided into zones onto which the selection means act. A correlator (25) performs the correlation calculation block-sequentially on the overall current block and a decision unit (28) determines the displacement vector. It is possible to chose for the correlator (25) an architecture which promotes either its calculation rate or a reduction in its hardware bulk. The invention is used to reduce the flow of data to be transmitted, more specifically for image (television, videophone) or sound processing.

12 Claims, 6 Drawing Sheets

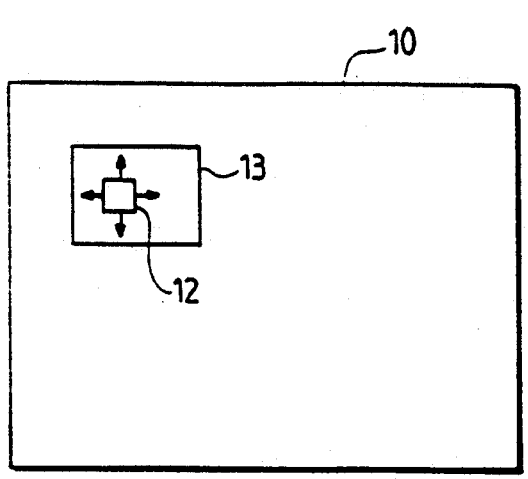
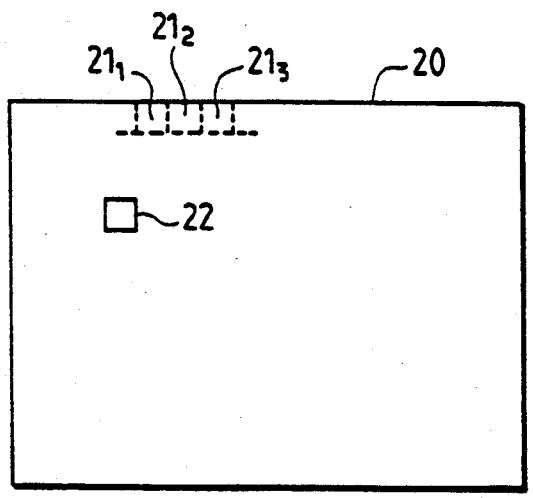
FIG. 1A   FIG. 1B
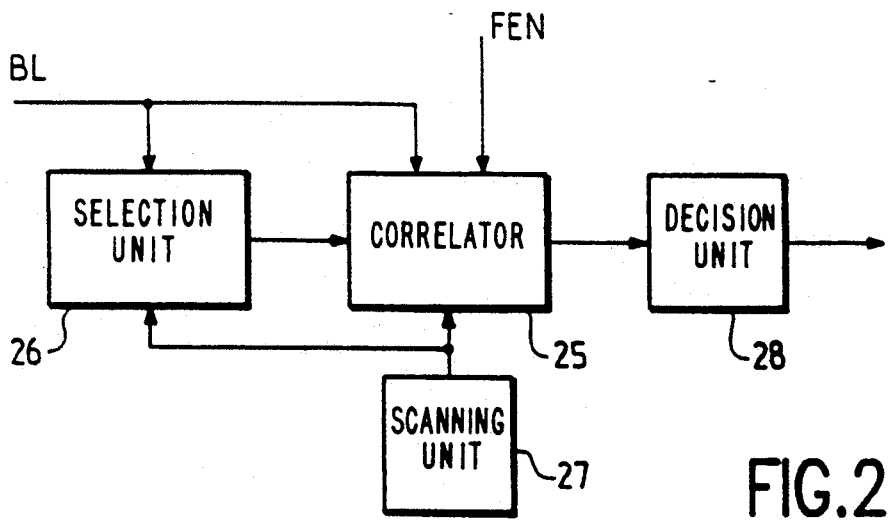
FIG. 2
 FIG. 4A   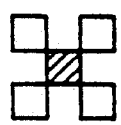 FIG. 4B
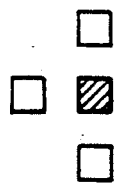 FIG. 4C   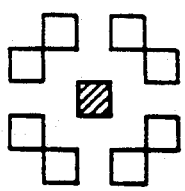 FIG. 4D

CORRELATOR DEVICE

BACKGROUND OF THE INVENTION

The invention relates to a correlator device acting on input signals which represent symbols organized in blocks in accordance with a regular configuration, comprising:
- a correlator determining a correlation between the symbols of a current block and symbols having identical positions in a sequence of blocks to be processed coming from said configuration,
- and selection means selecting from the symbols of said current block a limited number of reference symbols to which the correlation relates.

The regular configuration of input signals may be unidimensional or bidimensional. It may, for example, be a unidimensional configuration wherein correlations can act on input signal blocks of an acoustic origin for the processing of the sound. A symbol for the configuration is then a binary encoded signal. Preferably, bidimensional configurations are involved wherein the correlations act on images, for example animated pictures, in which motion vectors are determined of the animated sequence between the consecutive images. A symbol of the configuration then is a pixel. These applications are often undertaken with a view to reducing the data flow. They are encountered in, for example, the field of television (high data flow rate) or in the field of videophones and video-conferencing (low flow rate).

The use of the invention in motion estimation of animated images in television has evidenced very severe restrictions, more specifically because of the necessity to handle a very large quantity of calculations with a high flow rate. This application will therefore only be taken here by way of example without limiting the invention in any respect.

For the motion estimation of animated pictures, the most interesting technique seems to be the "block matching" technique, which consists in dividing the image blocks into pixels. For a given block of the image there is determined in a preceding image that block that is nearest to it in order to determine the motion of the animated sequence represented in the image. This motion information is transmitted, for each block, to the receiver member located at the end of the transmission channel.

The processing principle consists in tracking the development of the content of the images in successive images. This technique makes advantageous use of the fact that the data content varies only little from image to image. The displacement of the information contained in a block is generally restricted to a few neighbouring blocks. This tracking is effected by marking certain portions which may be the most significant portions or are intentionally chosen. This may relate to the totality of blocks of the image.

A current reference block (denoted "current block hereinafter for the sake of simplicity) may become located differently in either preceding or subsequent images. It is this displacement which is to be determined here. But this displacement remains limited and therefore a window is defined within which said current block is likely to be found.

The estimated motion is the translation between the position in the image of the current block and the position in the preceding/subsequent image of the preceding/subsequent block evidencing the strongest correlation. This renders it possible to determine a displacement vector relative to the current block. The correlation will therefore be determined pixel for pixel having the same position for all the possible positions of the current block inside the corresponding window. The same operations are repeated for all the other selected current blocks. The correlation is generally evaluated by adding together, for the overall block, the absolute values of the differences in the characteristics features from pixel to pixel and from block to block. The characteristic feature of the pixel is generally its luminance.

Two main conditions must be satisfied by an embodiment of a motion estimator: its capability of operating in real time, its hardware complexity. Different strategies have been developed, but certain algorithms requiring a lower number of operations were found to be less reliable and consequently more complicated to be put into operation. The reliability of the calculating phases is a condition to be taken into account, more specifically for the realization of dedicated integrated circuits. This explains the fact that the strategy usually put in operation consists in an exhaustive search covering all the pixels of all the blocks of the window. Scanning techniques for consecutively performing the analysis of each pixel of the current block in the window may permit a reduction in the hardware complexity of the embodiments.

Therefore efforts have been made to develop methods for making the motion estimation processing operation less complicated without any disadvantageous effect on its real time operation capability. On the basis of this research the article entitled "Motion-compensated interframe coding for video conferencing" by T. KOGA et al. National Telecommunications Conference, Nov. 29th-Dec. 3rd 1981 NEW ORLEANS LOUISIANE, was written. This document determines a motion estimation vector by introducing several operations, more specifically a sub-sampling operation, which renders it possible that only a limited number of pixels of each current block are taken into account, i.e. one out of every two pixels of a line for a first case and which may even be extended to one out of every two lines in a second case. This reduces the hardware complexity but has a negative effect on the motion estimation precision. The differential interimage coding, which is a preferred application of the motion estimation, consists in transmitting a prediction error, the latter being in the present case the previous block selected in the window. When the motion estimation is performed correctly, the prediction error is small and consequently the length of the code transmitted via a transmission channel is reduced. It will therefore be understood that the degradation in the precision of the motion estimation has an impact on the coding efficiency. Thus, in the cited prior art the error rate may increase to 50% for a transmission rate of 1.5Mbit/s. This requires an increase in flow rate in order to achieve an acceptable image quality.

Therefore, the problem posed is to design a correlation device which allows a simplified hardware implementation (compared with a customary implementation) and which can operate in real time with a reduced prediction error rate, even for television picture processing applications.

SUMMARY OF THE INVENTION

This object is achieved in that the correlator device whose selection means select, in the said current block, a reference symbol or symbols by choosing its/their position(s):
- either as a function of the data content of the said current block,
- or in accordance with a random selection,
- or for a first portion preferably as a function of the data content and for a second portion according to a random selection.

It is thus possible to adopt two complementary strategies which can be combined.

In the case of, for example, an image, in accordance with the first strategy, only the pixels containing a "distortion" information in the current block can advantageously be chosen for the correlation computation.

In accordance with the second strategy, the data content of the current block is ignored, and the selected reference pixels are randomly distributed in the current block.

These two strategies render it possible to disrupt the regularity of the selection performed when one out of two pixels is eliminated, and indeed even one line of every two lines. The regularity of this selection actually has the disadvantage that it suppresses the high frequency portion of the information spectrum and provokes an unacceptable error rate at high flow levels (cf. the document cited in the foregoing). In contrast thereto, according to the invention, the high frequency portion of the information spectrum is not suppressed and its importance can even be controlled by acting on the limited number of selected symbols of each block. By combining the data content strategy and the random selection strategy, this absence of regularity in the positions of the symbols in the current block is preserved and the error rate is still further reduced by tracking the content of the information very closely. In the latter case the reference symbols are preferably selected according to the data content and their number is completed by a random selection, up to the instant at which the predetermined limited number has been obtained.

When a block is constituted by pixels (or binary coded values, respectively), the selection consists in taking as a reference the pixels (or binary coded values, respectively) having a given position in the current block.

Further pixels which have the same position in the blocks of the window to be analyzed correspond to these pixels which have a predetermined position in the current block. The correlation calculated between two blocks is actually effected between the pixels of the two blocks that have the same position. The operation is continued for all the possible positions of the current block in the window. The processing is thereafter continued for a further block associated with a further search window. It is possible for the same random selection to be employed for a plurality of current blocks to select the position of the randomly selected reference symbol(s).

For the case in which the selection is effected while taking the data content of the current block into account, the position of the reference symbols in the current block is determined from a distortion function calculated for each symbol of the current block relative to the symbols surrounding it, the selected reference symbols being chosen from among the symbols whose distortion function values differ most from those relative to the surrounding symbols.

This distortion function can, for example, take account of the variation of a characteristic such as the luminance or other characteristics, between the adjacent pixels of the same current block. To determine the most representative pixels of a current block, the distortion function can be determined by calculating a Laplacian operator referring to the characteristic chosen for the input signal. In a more general way, account can be taken of the adjacent pixels surrounding a given pixel in an isotropic manner. But, in order to achieve that in a current block the reference pixels will not be concentrated in too localized a portion of the current block, it is possible to impose a distribution constraint by dividing the current block into several zones, for example in the shape of a regular or non-regular grid or any other meshlike shape. In this case it is imposed that all the zones or at least a portion thereof are represented by at least one pixel. This pixel in each zone can be chosen using the same strategies as those described already for a current block. Thus, when a current block is subdivided into several zones, the selection means act individually on each zone, the correlation always acting on the totality of reference pixels of the current block. Preferably, each zone of a current block has the same number of reference pixels. When the reference pixel(s) of the zones is (are) selected on the basis of the determination of a distortion function, the reference pixel(s) is (are) preferably selected in each zone so that the values of the distortion function characterizing them are alternately at their maximum or minimum for contiguous zones.

According to the invention, only a limited number of reference symbols are preserved in a block for performing the correlation calculation. This limited number can be chosen in a plurality of manners. It can be fixed a priori after preliminary trials which allow the establishment of a correlation calculation with an acceptable error rate. This may be realisable when the current block contains a reduced number of pixels, for example $4 \times 4$.

When a strategy is involved in which a distortion function is made operative which takes the data content into account, this limited number can be chosen from boundaries imposed on the values which can provide this distortion function.

More in general, when the size of the current block becomes large, it is possible to take into account the data content of the overall image and not only the data content of the current block for the determination of the limited number of symbols. To that end, a correlation matrix which is characteristic of all the input signals constituting the image, will be established. For the so-called "main component analysis" method, the proper values of this correlation matrix are calculated and the corresponding variances are determined among which the number of highest variances necessary for a good representation of the overall image, is determined. This number is then used as the limited number of reference symbols.

According to the invention, in this case the limited number of reference symbols is made to depend on the image content. In a large number of situations this limited number mainly remains linked to the types of image, i.e. to the application itself. Nevertheless, it is possible to obtain a finer control of the said number limited to the content of the image by determining it regularly and in an adaptive manner over parcel of images. This can be realised with the use of a correlation device having a neural network which makes the so-called "main component analysis" operative and selects the number of highest variances. This number of variances is cyclically introduced into the selection means for constituting the said limited number so as to enable operation as described in the foregoing.

A neural network is a known signal processing device which, after a programming or a learning stage, can effect predetermined processing operations, for example a "main component analysis" of the input signal distribution. Such a neural network may, for example, be the neural network described in the document: "Optimal unsupervised Learning in single-layer linear Feed-forward Neural networks" T. D. SANGER Neural Networks, vol. 2, 1989, pages 459–473.

As has been described in the foregoing, the fact that the correlation calculation only occurs for certain reference symbols having a certain position in the current block allows a simplification of the hardware implementation, an increase in the processing rate whilst preserving the error rate with low and controllable values.

In addition, the reference symbol selection mechanisms render it possible to provide in certain situations an additional simplification of the complexity of the hardware implementation. Particularly when the current block is subdivided into zones, this advantageously permits either a gain in processing rate or a gain in hardware complexity to be achieved. This situation occurs when the correlation device effects a correlation calculation using current data blocks subdivided into p zones with n/p selected reference symbols per zone, the correlator comprising:

- a systolic network of registers in which window pixel data are transferred from one register to the other,
- a plurality of processors, each processor effecting a calculation of the correlation of at least one displacement vector, the device making operative a first calculating stage during which:
  a) each processor performs a correlation calculation on the successive n/p selected reference symbols of a first zone, the said calculation successively bearing on all the displacement vectors the said processor is to calculate,
  b) storage means store the intermediate results supplied by the processors at the end of a),
  c) transfer means transfer the content of the registers acting on a zone to subsequent registers acting on a next zone, the said first calculation stage being thereafter reiterated for the subsequent p-1 zones, summing means determining the sum of the intermediate results relative to each block to be processed to supply the correlations of the said sequence of blocks.

A particularly interesting case occurs for the processing of images, when the said zones include several pixels of which only one is selected to effect the correlation calculation. It is then possible to obtain an additional gain and to chose, for the correlator, between an architecture promoting the processing rate or an architecture promoting the simplicity of the hardware, that is to say which reduces the surface for an integrated implementation.

For the processing rate promoting architecture, the correlator includes substantially as many processors as there are possible numbers of displacements in the window and it acts on a reduced number of reference pixels which increases its performance rate compared to the situations in which the totality of pixels of the current block is used. A particularly interesting case is the case in which each zone only includes 4 pixels, with one single reference pixel selected per zone. In this case the correlator acts on a bidimensional pixel window with current blocks which are divided into zones each having 4 pixels, one single reference pixel being selected in each zone, a bidimensional register matrix storing, at a given instant, the pixels of the said window in accordance with the same lay-out, four registers being assigned to the processing of a zone, rows of the said registers exchanging, in the two matrix directions, pixels of the even order of the window and further register rows exchanging pixels of the odd order of the window, this pixel exchange being unidirectional along one direction of the window and bidirectional along the other direction of the window, a processor being assigned to the processing of each displacement vector and operating with four registers containing even and odd pixels of the window, the serial number of the said pixels taken two by two being consecutive in each direction, a common selection signal causing the processors to operate with register data corresponding to the reference pixels selected in the current block.

For the case in which the architecture promoting the simplicity of the hardware is used, a particularly interesting case is the case in which the correlator acts on a bidimensional pixel window with current blocks subdivided into rectangular zones containing k pixels with one single reference pixel selected in each zone, a bidimensional matrix of registers storing, at a given instant, the pixels of the said window according to the same lay-out, k registers being assigned to the processing of a zone, rows of the said registers exchanging bidirectionally pixels of the window in the two directions of the matrix, a processor being assigned to the successive processing of k displacement vectors whilst operating with k registers containing pixels belonging to the same zone, the serial numbers of the said pixels being consecutive in the two directions, a selection signal causing each processor to operate, for each displacement, with the data of the registers corresponding to the reference pixel selected from the current zone.

The invention is not limited to the case in which bidimensional configurations of symbols are used. It also relates to unidimensional configurations. The symbols may thus be binary encoded values representing a unidimensional configuration of acoustic signals. The correlation device then acts on current blocks surrounding several of the said values from which reference values are selected, in a limited number, and in position.

BRIEF DESCRIPTION OF THE DRAWINGS

The invention and how it can be put into effect will be better understood from a description with reference to the accompanying Figures, given by way of non-limitative example and wherein:

FIGS. 1A, 1B: show an image in which there is a window enclosing blocks to be processed onto which the correlation must bear and a current block in a subsequent image, FIG. 2: is a block circuit diagram of a correlation device, FIGS. 4A, 4B, 4C, 4D: show pixels surrounding a given pixel for calculating the distortion function.

FIG. 1A shows an image 10 and FIG. 1B an image 20 which may precede but preferably is subsequent to the image 10 on which the correlation calculation is performed.

DETAILED DESCRIPTION OF THE PREFERRED EMBODIMENTS

Figure 3A:
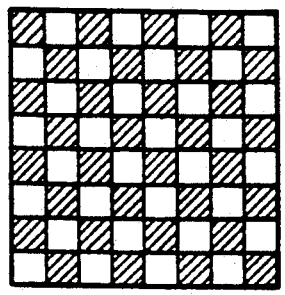
FIGS. 3A, 3B: show a current block of 8×8 pixels, indicating the positions of the reference symbols selected in accordance with the prior art.

The image 20 is formed from pixels which are analyzed in the form of current blocks, for example the blocks $21_1$, $21_2$, $21_3$. In the image 20, for any current block, for example the current block 22, the processing operation will consist in determining with which block of the preceding image 10 it is correlated. To that end a window 13 is defined around a block 12 which, in the image 10, has the same coordinates as those of the current block 22 in the image 20, which window surrounds the block 12 in order to limit the number and the position of the blocks to which the search will relate as being the most probable blocks in which the correlated block will be present. The size and shape of this window depends on the extent of the search one wants to effect and consequently ultimately on the processing time possible to consecrate to the examination of a window and also on the complexity allowed for the hardware implementation resulting therefrom. Thus the current block 22 (image 20) is compared to all the blocks of the window 13 of the image 10 obtained by displacing the block in consecutive steps of at least 1 pixel.

At the end of this processing operation a further current block is chosen in the image 20 to which a further window in the image 10 corresponds and the same processing is effected, and so on. The current blocks chosen in the image 20 may be of a limited number but preferably all the blocks are submitted to the same processing operation. A displacement vector of the current block is each time derived as a function of the position of the current block in the image 20 and the position of the correlated block in the image 10. This displacement vector as well as the deviation in the characteristic of the pixel (for example the luminance) is encoded and transmitted via the transmission channel so as to effect a data compression.

The correlation device putting the processing into effect is shown in FIG. 2. It comprises a correlator 25, a selection unit 26 which determines to which pixels of the current block 22 the correlation must relate, a scanning unit 27 which determines the sequence in which the pixels of the block 12 and in a wider sense of the window must be analyzed. A decision unit 28 determines at the output of the correlator 25 the block of the window 13 for which the correlation is at its maximum. The current block BL to be processed is incorporated in a selection unit 26 and in the correlator 25. The latter also receives the overall window FEN which can be controlled at the performance rate necessary to the application.

The correlation consists in successively comparing two blocks to each other by comparing the pixels having respective identical positions in each block. It is customary to effect an exhaustive processing bearing on the totality of the pixels of the blocks. But as described in the document mentioned in the foregoing, it is possible to reduce the importance of the processing operation by only taking a limited number of pixels per current block into consideration.

Figure 3B:
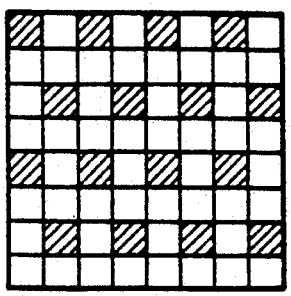

FIGS. 3A and 3B show two possibilities put into effect in the said document. They show an 8×8 pixels current block in which the reference pixels selected for performing the correlation are hatched. In FIG. 3A one pixel out of every two pixels are selected, which divides the processing operation by 2. In FIG. 3B one complete pixel line out of two lines is ignored which again divides the processing operation by 2. Limiting the number of reference pixels in the above manner can easily be performed by, for example, acting on the scanning clock periods. But the high degree of regularity resulting from these limiting modes causes the high frequency portion of the spectrum of a data block to be truncated and a considerable error rate to appear.

To obviate this drawback, in accordance with the invention, a regular selection of the reference pixels within a current block is not systematically performed.

Figure 3C:
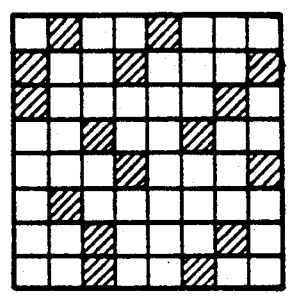
FIGS. 3C, 3D, 3E, 3F: show by way of example, a current block of 8×8 pixels, indicating the positions of the reference symbols selected in accordance with the invention.

A first strategy shown by way of example in FIG. 3C consists in a random selection at the occurrence of a limited predetermined number of reference pixels. Thus, in FIG. 3C the 16 reference pixels selected randomly in the current block are hatched.

Figure 3D:
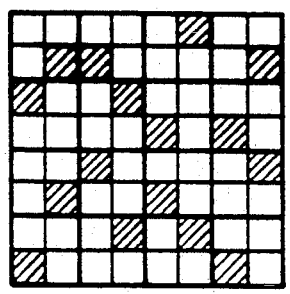
Figure 3E:
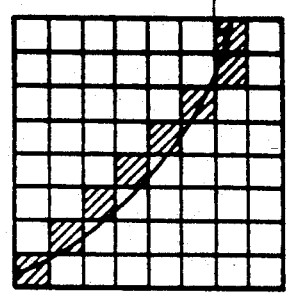

A second strategy shown by way of example in FIG. 3E takes the data content enclosing the current block into account. So let it be assumed that an imaginary curve 31 defines in the current block two portions having different luminances. In accordance with the invention, the reference pixels selected for performing the correlation will be determined taking account of the data content while determining a distortion function. In brief, it can be stated that the selection will be effected in the portions in which the characteristic (in this case the luminance) is submitted to the variations relative to its near neighbours. All the pixels of the current block are examined thus. The selection unit 26 (FIG. 2) takes this decision. FIGS. 4A, 4B, 4C, 4D show some possible modes of examining the data content with isotropic distributions.

FIG. 4A shows a preferred embodiment which consists in comparing for a given (hatched) pixel its luminance variation with its neighbours having coordinates which are each spaced apart by ±1. This amounts to calculating a Laplacian Δ such as:

$$\Delta = 4I(x,y) - (I(x+1,y) + I(x,y+1) + I(x-1,y) + I(x,y-1))$$

For FIG. 4B the distortion function is:

$$\Gamma = 4I(x,y) - (I(x+1,y+1) + I(x+1,y-1) + I(x-1,y+1) + I(x-1,y-1))$$

For FIG. 4C the distortion function is:

$$\Lambda = 4I(x,y) - (I(x+2,y) + I(x-2,y) + I(x,y+2) + I(x,y-2))$$

For FIG. 4E the distortion function is:

$$\Psi = 8I(x,y) - (I(x+1,y+2) + I(x+1,y-2) + I(x-1,y+2) + I(x-1,y-2) + I(x+2,y+1) + I(x-2,y+1) + I(x+2,y-1) + I(x-2,y-1))$$

Further distributions of the neighbouring pixels are possible, even when they are not isotropic.

When the distortion function has thus been calculated for all the pixels of the current block, the selection unit determines the pixels having the extreme values so as to select them to represent the said current block.

According to these two strategies just described, it appears that certain portions of a current block cannot be or are not represented. To limit the error this may cause in the correlation, it may be desirable for these portions to be represented at least partially. To that end, more specifically in accordance with the invention, the current block is divided into zones, which may be either regular or not regular. The current block is preferably subdivided into identical zones having the same number of pixels. This causes the random selection to relate no longer to the level of the current block but to the level of the zone. Thus the reference pixels are randomly selected per zone. This is shown in FIG. 3D where 16 randomly selected reference pixels are represented by means of hatching. A similar random selection of this type can be employed for several current blocks to perform the correlation calculation. Although the random selection is effected at the level of the zone, the correlation calculation remains at the level of the current block.

Figure 3F:
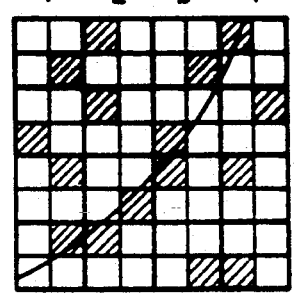

FIG. 3F shows the situation in which the two strategies can be combined. For that purpose a first portion of the reference pixels is preferably selected as a function of the data content and a second portion is selected by means of a random selection per zone. This second portion is limited until the instant at which the totality of selected reference pixels reaches the preset limited number.

Figure 5:
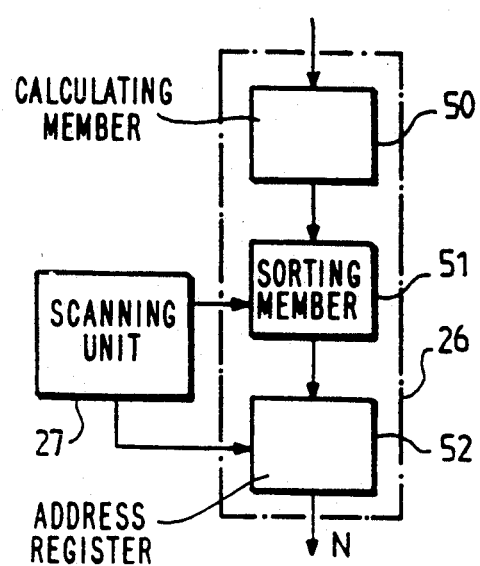
FIG. 5: is a circuit diagram of a portion of the selection means providing the calculation of a distortion function as shown in FIG. 4A, FIG. 6: is a detailed circuit diagram of a selection unit comprising a member for calculating a Laplacian and a sorting member.

The circuit diagram of FIG. 5 shows a selection unit 26 determining the position of the pixels in a current block from the calculation of a distortion function (preceding functions Δ, Γ, Λ or Ψ) performed in a calculating member 50. The results obtained are sorted in a sorting member 51 in accordance with a sorting algorithm in order to limit the number of reference symbols in each current block. The addresses of the retained reference symbols are stored in an address register 52 for use by the correlator. The selection unit 26 operates under the control of the scanning unit 27.

Figure 6:
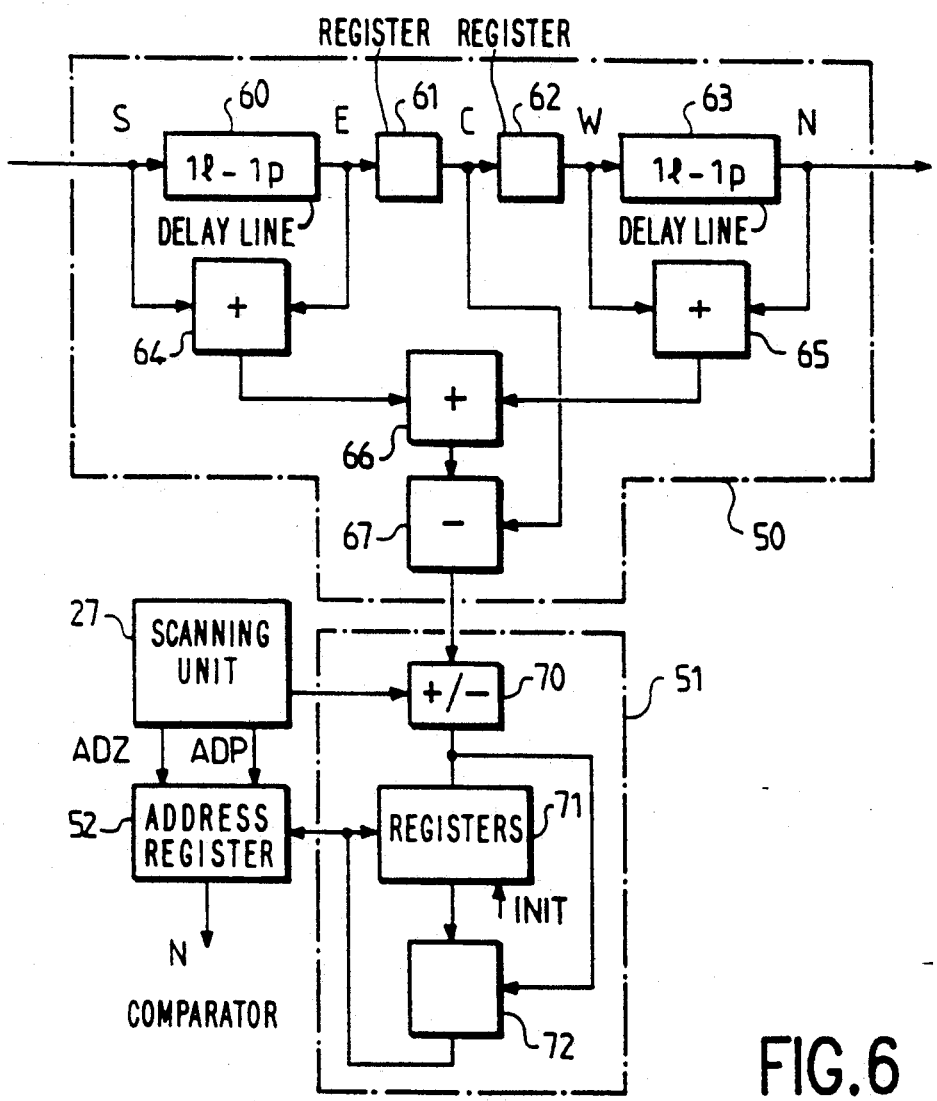

A detailed circuit diagram of the calculating member 50 and the sorting member 51 is shown in FIG. 6 for the case in which the distortion function is the laplacian Δ defined in the foregoing. This distortion function corresponds to what is shown in FIG. 4A wherein the letters N, S, E, W represent the respective cardinal points North, South, East, West. These letters are plotted in the circuit diagram of FIG. 6, the letter C representing the centre pixel. The situation relates to the fact in which the scan applies to all the pixels of the current block in accordance with a line-sequential scanning. In FIG. 6 there is shown a delay chain constituted by:
 a first delay line 60 and a second delay line 63 each delaying the data for the duration of a line minus the duration of a pixel,
 a first register 61 and a second register 62 each delaying the data for the scanning period of a pixel.

Thus, after three scanning lines, the data of the pixels N, S, E, W have been distributed as shown in FIG. 6: the data N are at the output of the delay line 63 and the data S are at the input of the delay line 60.

An adder 64 and an adder 65, respectively, perform the adding operations S+E and W+N. The two results are added together in an adder 66, which must be reduced by 4 times the value of the centre data C. This is shown at C between the two registers 61 and 62. For the multiplication by 4 it is sufficient to shift it through 2 bits at the input of the subtractor 67 which receives the output of the adder 66. The output of the subtractor 67 supplies the distortion function Δ which is calculated for all the pixels of each current block. A limited number of pixels is selected from among all these pixels to constitute the reference pixel with the aid of the sorting member 51. In accordance with a preferred embodiment, those pixels are sorted in the totality of all the blocks in a current block for which the distortion function Δ is either at its maximum or at its minimum and this sorting operation is applied to the case in which the block is divided into zones whilst providing that two contiguous zones have functions Δ which are alternately positive and negative.

To that end, the sorting member comprises:
 a sign selector 70 controlled by the scanning unit 27,
 a set of registers 71 storing maximum/minimum values for each zone,
 a comparator 72 determining for each zone the value, either maximal or minimal according to the required sign, to be preserved.

The addresses of the selected reference pixels are stored in the address register 52 which receives the pixel addresses ADP and the zone addresses ADZ from the scanning unit.

The scanning unit 27 supplies the rate of the alternately + and − signs assigned to each zone. When the positive sign is assigned to a zone, the result supplied by the calculating member 50 is taken with its sign, thereafter compared to the preceding value stored in the same zone in the set of registers 71. If the last value is the highest, it replaces the old value in the register set 71. The address of the corresponding pixel ADP is simultaneously stored in the address register 52.

When the negative sign is assigned to an other zone, the result supplied by the calculating member 50 is taken by inverting its sign. It is compared to the preceding value stored for the same other zone in the register set 71. Because of the sign inversion, the same comparator operates in the same manner for both cases by determining a maximum.

At the end of the scan, the address register 52 contains the result of the sorting operation, that is to say, for each zone, the address of the selected pixel, having the maximum or minimum distortion of the zone.

The circuit diagram of FIG. 6 corresponds to the calculation of the distortion function relative to FIG. 4A. By applying the same method, a person skilled in the art can establish without any difficulty the circuit diagram of the calculating member performing the calculation of the distortion functions of the FIGS. 4B, 4C and 4D.

To realise a compact and regular implementation in accordance with this feature of the invention, it is advantageous to have the correlation device act on blocks of N×N pixels, wherein N=16, from which n reference pixels are selected, wherein n=8.

Up to now, the number of reference symbols in a current block was limited and predetermined in advance, the selection being effected on the position of the selected pixels in the current block. The number itself can be determined in a plurality of manners. When the number of pixels in the current block is a little high, it is possible to make preliminary trials as a function of the type of images (so the configuration) to be processed. At each trial the number of selected reference pixels is reduced, an error function is calculated between the starting image and the recovered image and this number is determined according to the acceptable error level. A same number can apply to several types of images.

Figure 7:
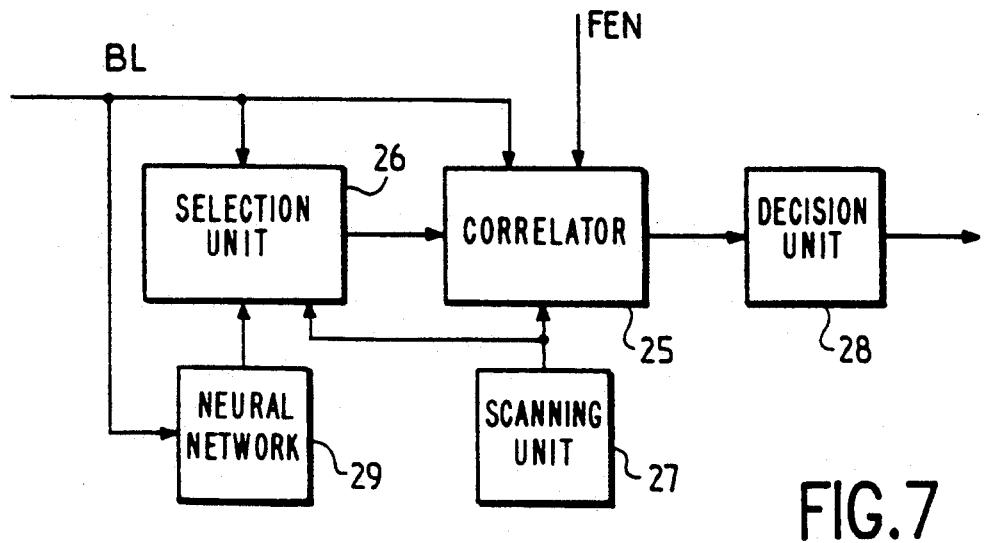
FIG. 7: is a block circuit diagram of a correlation device comprising a neural network to determine the number of reference symbols.

When the number of reference pixels per current block increases, the preliminary trial method may become wearisome. It is then recommendable to analyze the images on the basis of characteristics representative of the pixel distribution. In this case the invention recommends the use of the "analysis by main components" of the said distribution (here to be understood in the mathematical sense of the term). The actual values of the correlation matrix are calculated with respect to this distribution and the corresponding variances from which the number of highest variances sufficient for a correct representation of the image is determined. This number of variances is selected as the limited number of reference pixels. This calculation may have been effected previously for type-images and may thereafter be employed in the correlation device. But it is also possible to effect it adaptively on the images applied to the correlation device. Thus the limited number of reference pixels can dynamically be adapted to the images to be processed so as to perform a more precise processing operation. This calculation is effected at a rate depending on the images to be processed by a neural network which puts into effect the "main component analysis" technique. This is shown in FIG. 7 which illustrates the same elements as FIG. 2 with the addition of a neural network 29 receiving the image blocks to be processed and applies to the selection unit 26 the limited number of reference pixels to be selected.

Figure 8:
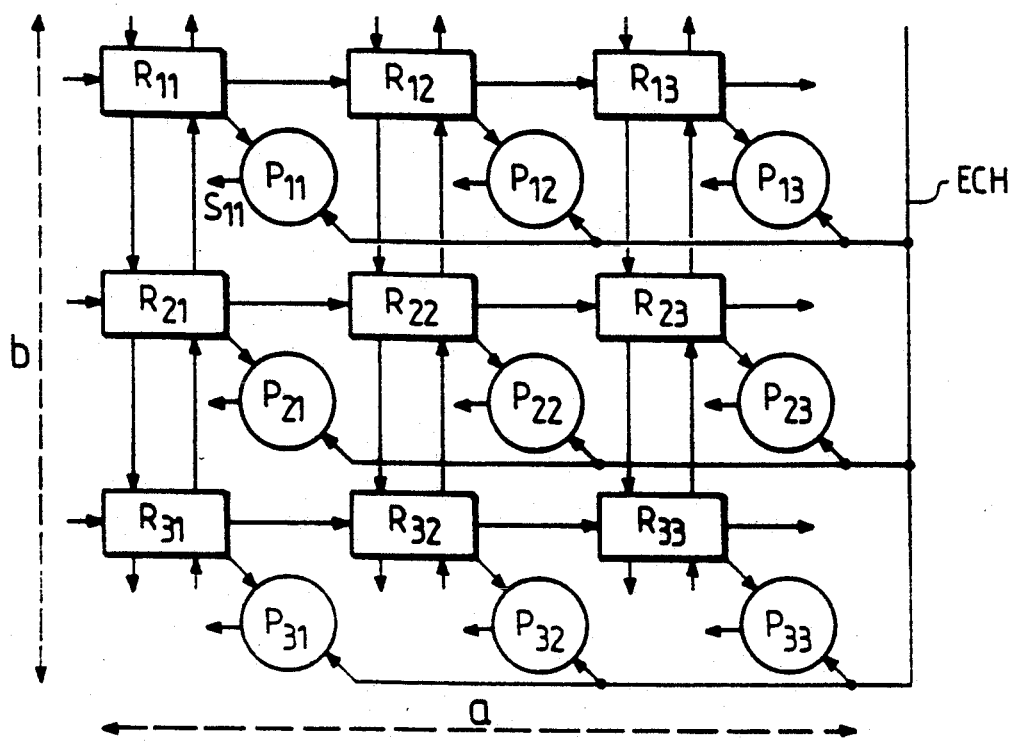
FIG. 8: is a circuit diagram of a prior art correlator.

FIG. 8 shows the circuit diagram of a conventional correlator structure. It is formed by systolic networks of a.b cells wherein a and b are the dimensions of the search window. Each cell contains a register R storing the value of a sample and an elementary processor P, connected to the register R, which calculates the correlation function. The correlator includes as many cells as there are pixels to be analyzed in the window. Each cell has a predetermined position with respect to the window, it consequently has a displacement vector suitable to it.

FIG. 8 shows a 9-cell correlator. A first row contains the cells $R_{11}/P_{11}$ to $R_{13}/P_{13}$, a second row contains the cells $R_{21}/P_{21}$ to $R_{23}/P_{23}$, a third row contains the cells $R_{31}/P_{31}$ to $R_{33}/P_{33}$. Each register is connected to its four nearest neighbours via 3 receiving links and 3 transmitting links. Thus, for example, the register $R_{22}$ receives data from the registers $R_{12}$, $R_{21}$, $R_{32}$. The same register $R_{22}$ applies data to the registers $R_{12}$, $R_{23}$, $R_{32}$. Each registers successively contains the data relating to all the pixels of a block to be analyzed. The processor assigns to the said register calculates each time the correlation function between this data and the value ECH of the current sample which is distributed over all the processors. If c and d are the dimensions of the block to be analyzed, c.d cycles are required to accumulate the total distortion function relative to a block to be analyzed. At each cycle the value of the sample of the current block is transferred to the set of processors and the totality of contents of the registers R is shifted one step so that for all the processors there is always the same displacement D between the data of the register R and the transmitted data. Supplementary members (not shown) render it possible to determine the correlator that provides the best correlation and to derive therefrom the displacement vector on the basis of the position of this best processor in the network. Consequently, a.b cells operating in c.d cycles are required.

In the structure shown in FIG. 8, a processor is assigned to a register for processing all the pixels of a current block. According to the invention, this number of pixels to be processed is limited, so that lay-outs are possible which provide a gain either in the rate of a substantially similar hardware bulk, or in the hardware bulk at a substantially constant rate.

Figure 9A:
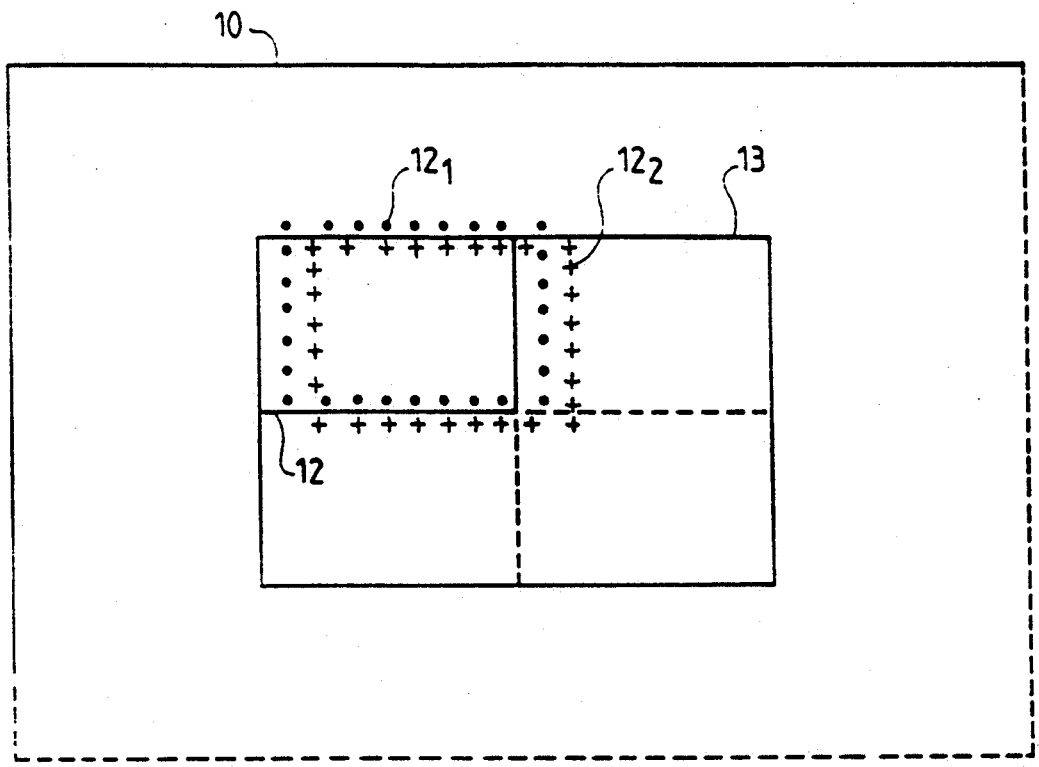
FIGS. 9A, 9B: show blocks to be processed in a window and a current block divided into zones.
Figure 9B:
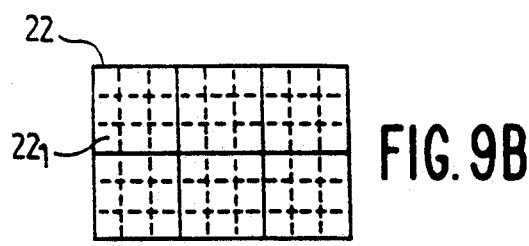

Significant advantages are obtained when the current block is subdivided into zones. FIGS. 9A, 9B schematically represent the processing operation effected. FIG. 9B shows a current block 22 subdivided into 6 zones, for example the zone $22_1$, which themselves are formed from pixels. In this example a zone encloses 9 pixels from which the reference pixels are selected.

Moreover, a window 13 to be processed is shown in an image 10. Processing the overall image consists in performing successive processing operations on a sequence of such windows. In accordance with what has been described hereinbefore, the correlation calculation consists in a pixel-by-pixel correlation of the current block 22 with each block to be processed constituting the window, for example the block 12. All the blocks to be processed in the window are obtained by successive shifts in 1-pixel steps in the two directions. The block 12 successively shifts through one pixel according to the block $12_1$ (dots), thereafter according to the block $12_2$ (crosses). They are slightly shifted in the vertical direction to enable them to be shown. For the case in which the current block is subdivided into zones, the correlation calculation with the blocks to be processed is performed at two levels.

First the reference pixels of a predetermined zone are considered, for example the pixels of zone $22_1$ of the current block (top left).

The correlation is calculated for the pixels of each block to be processed (in a window) having the same relative position in the block, i.e. for the same upper left zone in the block. Thus intermediate results concerning a particular zone are obtained for all the blocks. The calculation is thereafter performed for the subsequent zone in accordance with the same procedure.

The processing can be shown schematically in the following manner:

--- first zone:
first block
second block
...
second zone:
first block
second block
...

---

Effecting calculations in this sequence has the advantage that it reduces the exchange of data between the registers which simplifies the architecture and reduces the calculation time.

Figure 10:
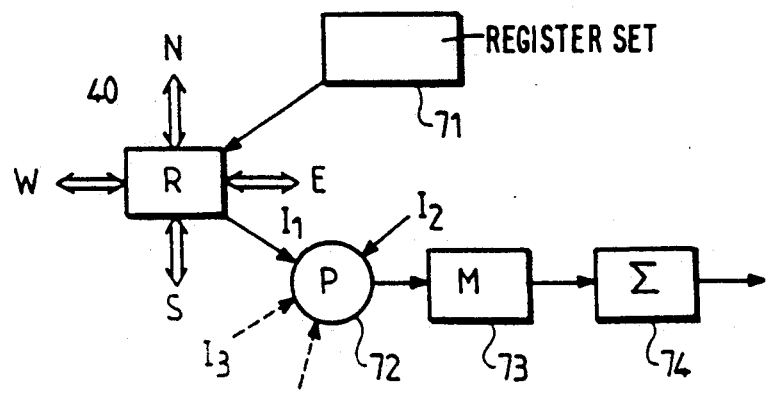
FIG. 10: is a circuit diagram of a processor surrounded by basic members required for its proper operation.

FIG. 10 shows the basic members required for effecting the correlation calculations. The circuit diagram shows only one processor and one register but the situation is the same for the further processors and the further registers.

A randomly chosen register 40 is connected to further neighbouring registers, for example in the four directions N, S, E, W via bidirectional or unidirectional buses depending on the architecture used. These data transfers between the registers are controlled by control means 71 used in common by all the registers. A processor 72 is connected to several of these registers via lines $I_1, I_2, I_3, \ldots$ which transfer the data from the registers. This number of connections also depends on the architecture used. The processor 72 performing the calculations in consecutive steps must temporarily store intermediate results relative to the zones, which themselves are subdivided according to the blocks. These intermediate results are storage means 72.

When all the intermediate results have been obtained, they are added together in summing means 74 to supply for each block the totality of intermediate results referring to all the zones of the said block. Thus a series of correlation values is obtained appertaining to the different blocks from which that block is selected that, having the best correlation, constitutes the block whose position constitutes the new position of the current block in the image.

Figure 11:
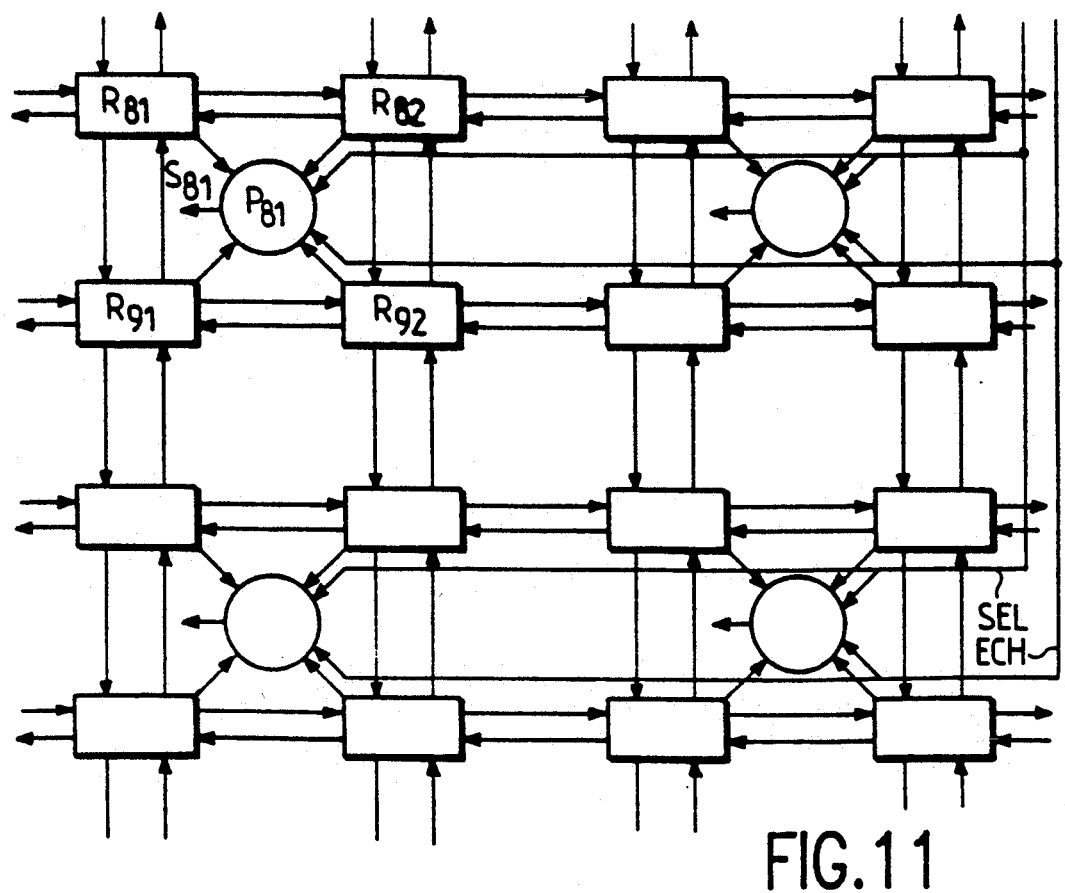
FIG. 11: is a circuit diagram promoting the simplicity of the hardware acting on current blocks divided into zones containing 4 symbols from which a reference symbol is chosen.

FIG. 11 represents the circuit diagram of a portion of the correlator in accordance with the invention which promotes a reduction in the number of cells. In this case one processor P is no longer associated with one single displacement vector, but the processor is caused to act on a plurality of displacement vectors, for example f displacements (so f registers). In this case there are a.b registers R and a.b/f processors. When this value f is equal to the number of dots per zone, i.e. f=c.d/n a certain number of the lay-outs already present can advantageously be used. In this case each register is connected to the registers in its immediate neighbourhood and one or the other processor (for example $P_{81}$) receives the data stored in the registers surrounding it ($R_{81}, R_{82}, R_{91}, R_{92}$, respectively). When, for example, 4-pixel zones are used (FIG. 11) from which 1 reference pixel is selected, 16 registers and 4 processors are then required to process one window of 4×4 pixels. All the processors receive a selection signal SEL which indicates the reference pixel selected in the zone. This architecture can easily be made suitable for general usage for zones having k pixels from which one single reference pixel is selected for each zone. Each processor supplies the results of its calculation from a suitable output, for example $S_{81}$ for the processor $P_{81}$. More generally, when a and b are dimensions of the window, c and d the dimensions of the current block having n reference pixels selected in each zone, the correlator has a.b registers, a.b/f processors and operates on c.d cycles.

Figure 12:
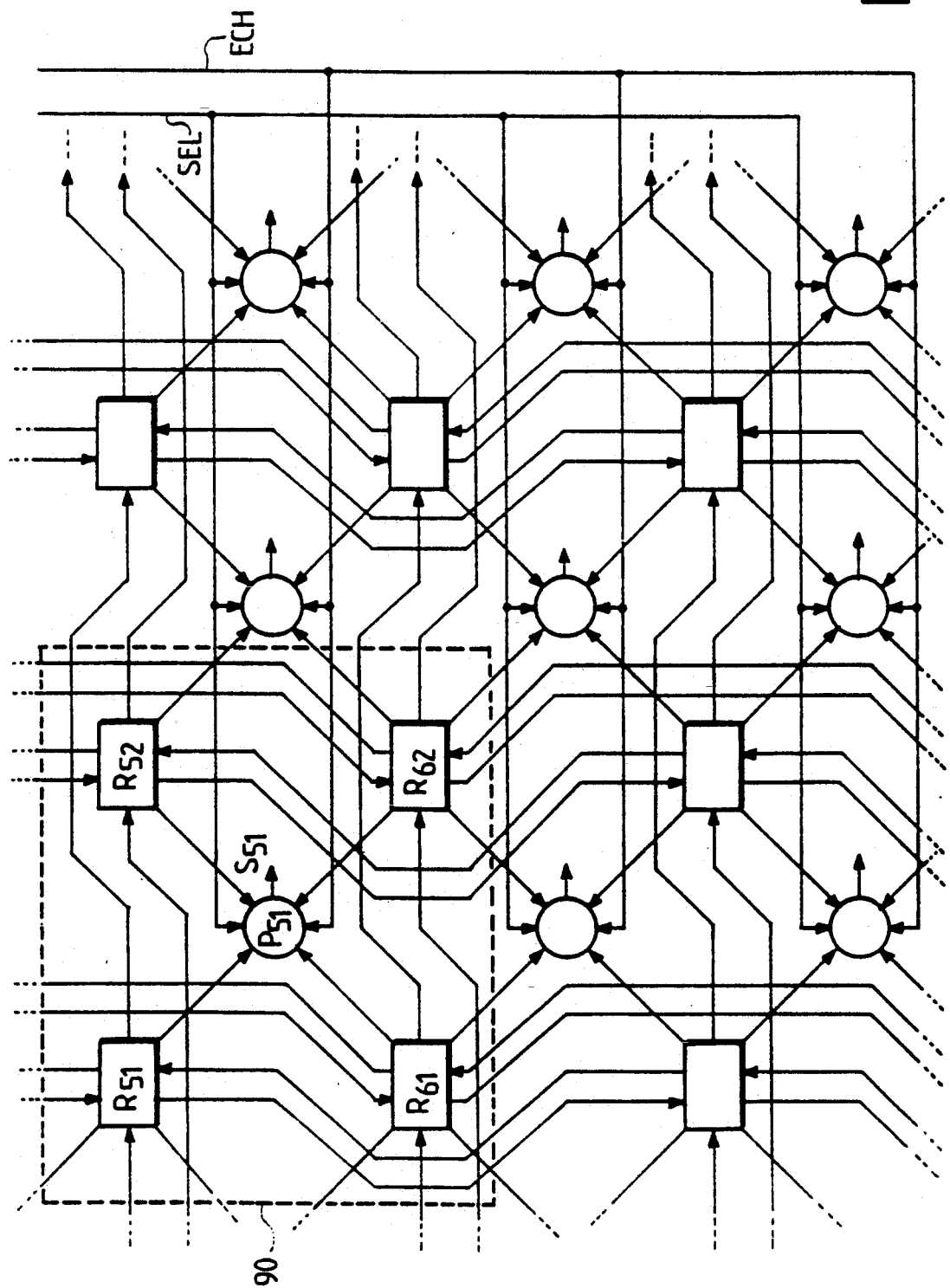
FIG. 12: is a circuit diagram of a processing rate promoting correlator acting on current blocks divided into zones of 4 symbols.

FIG. 12 shows the circuit diagram of a recurrent portion of a correlator of the invention which promotes the gain in processing rate for the case in which current blocks are cut into zones. This circuit diagram corresponds to 4-pixel zones from which one single reference pixel is selected to effect the correlation. The processing to be effected for a particular zone will be performed by members located within the broken-line frame 90. This frame encloses four registers $R_{51}, R_{52}, R_{61}, R_{62}$ all connected to the same processor $P_{51}$. Each register is no longer connected directly to the register preceding and subsequent to it as in FIG. 8 but the connections in both the line and column directions skip every second register. This lay-out results from the fact that when selecting one out of 4 pixels per zone, one of every 2 pixels must be skipped (FIG. 3D) in the two directions.

A selection signal SEL enables the processor to act on one of the four surrounding registers in which at a given instant the values of the 4 pixels of the zone are stored. In a more general case, when the block contains c.d pixels from which n reference pixels are selected, c.d/n connections are consequently required between each register and the neighbouring registers. The value ECH of the sample is simultaneously transferred to all the processors to calculate the correlation. When a window of a.b blocks is used, an a.b-cell correlator is required, operating in n cycles. Each processor supplies the result of its calculation from a suitable output, for example $S_{51}$ for the processor $P_{51}$.

We claim:

1. A correlator device acting on input signals which represent symbols organized in blocks in accordance with a regular configuration, comprising:
   a correlator determining a correlation between the symbols of a current block and symbols having identical positions in a sequence of blocks to be processed coming from said configuration,
   and selection means selecting from the symbols of said current block a limited number of reference symbols to which the correlation relates, characterized, in that, the selection means select, in the said current block, a reference symbol or symbols by chosing its/their position(s):
   either as a function of the data content of the said current block,
   or in accordance with a random selection,
   or for a first portion preferably as a function of the data content and for a second portion according to a random selection.

2. A device as claimed in claim 1, wherein, the same random selection is used for a plurality of current blocks for selecting the position of the randomly selected reference symbol(s).

3. A device as claimed in claim 1, wherein the said position adapted to the data content is determined from a distortion function calculated for each symbol of the current block with respect to the surrounding symbols, the selected reference symbol(s) being chosen from the symbols of the current block whose values of the distortion function differ most from those with respect to the surrounding symbols.

4. A device as claimed in claim 3, characterized, in that, the said distortion function is determined by calculating a laplacian relating to a characteristic inherent to the input signal.

5. A device as claimed in claim 1, wherein that, the current block is divided into several blocks, the selection means acting separately on each zone, the correlation acting on the totality of the selected reference symbols of the current block.

6. A device as claimed in claim 5, wherein that, the reference symbol(s) of a zone is(are) selected in such a manner that the distortion function is alternately maximal and minimal for contiguous zones.

7. A device as claimed in claim 1, wherein that, it includes a neural network which adaptively determines the number of reference symbols as a function of the data content by calculating suitable values of the correlation matrix and the variances, said number of symbols being equal to the number of highest variances which are characteristic of the set of input signals.

8. A device as claimed in claim 1, wherein that, the symbols, organized in a regular configuration are pixels constituting an image, the correlation device acting on blocks of $4 \times 4$ reference pixels from which n reference pixels are selected ($n < N1^2$), the correlations being determined between a current block and blocks of a window taken in the image, the current block being obtained from a preceding or a subsequent image to determine the displacement vectors of the image blocks.

9. A device as claimed in claim 1, wherein that, the symbols are binary encoded values representing a unidimensional acoustic signal configuration, the correlation device acting on current blocks enclosing several of the said values from which reference values are selected in a limited number and in position.

10. A device as claimed in claim 1 which effects a displacement vector calculation relative to a set of data blocks to be processed contained in a window, characterized, in that, the correlator effects a correlation calculation using current data blocks subdivided into p zones with n/p selected reference symbols per zone, the correlator comprising:

a systolic network of registers in which pixel data of the window are transferred from one register to the other, a plurality of processors, each processor effecting a calculation of the correlation of at least one displacement vector, the device making operative a first calculating stage during which:

a) each processor performs a correlation calculation on the successive n/p selected reference symbols of a first zone, the said calculation successively bearing on all the displacement vectors the said processor is to calculate, b) storage means store the intermediate results supplied by the processors at the end of a), c) transfer means transfer the content of the registers acting on a zone to subsequent registers acting on a next zone, the said first calculation stage being thereafter reiterated for the subsequent p-1 zones, summing means determining the sum of the intermediate results relative to each block to be processed to supply the correlations of the said sequence of blocks.

11. A device as claimed in claim 10, wherein the correlator acts on a bidimensional pixel window having current blocks divided into rectangular zones containing k pixels, one single reference pixels being selected per zone, a bidimensional matrix of registers storing, at a given instant, the pixels of the said window according to the same lay-out, k registers being assigned to the processing of a zone, rows of the said registers exchanging pixels of the window in the two directions of the matrix, a processor being assigned to the consecutive processing of k displacement vectors while operating with k registers containing pixels belonging to the same zone, the serial numbers of the pixels being consecutive in both directions, a selection signal causing each processor to operate, for each displacement, with the data of the register corresponding to the selected reference pixel of the current zone.

12. A device as claimed in claim 10, wherein the correlator acts on a bidimensional pixel window having blocks divided into zones containing 4 pixels each, one single pixel being selected in each zone, a bidimensional matrix of registers storing, at a given instant, the pixels of the said window according to the same lay-out, four registers being assigned to the processing of a zone, rows of the said registers exchanging, in both directions of the matrix, even pixels of the window and further register rows exchanging odd pixels of the window, this exchange being unidirectional in one direction of the window and bidirectional in the other direction of the window, a processor being assigned to the processing of each displacement vector and operating with four registers containing even and odd pixels of the window, the serial numbers of the said pixels taken two by two being consecutive in each direction, a common selection signal causing the processors to opeate with the data of the registers corresponding to the selected reference pixels in the current block.

* * * * *